United States Patent Office 3,308,924
Patented Mar. 14, 1967

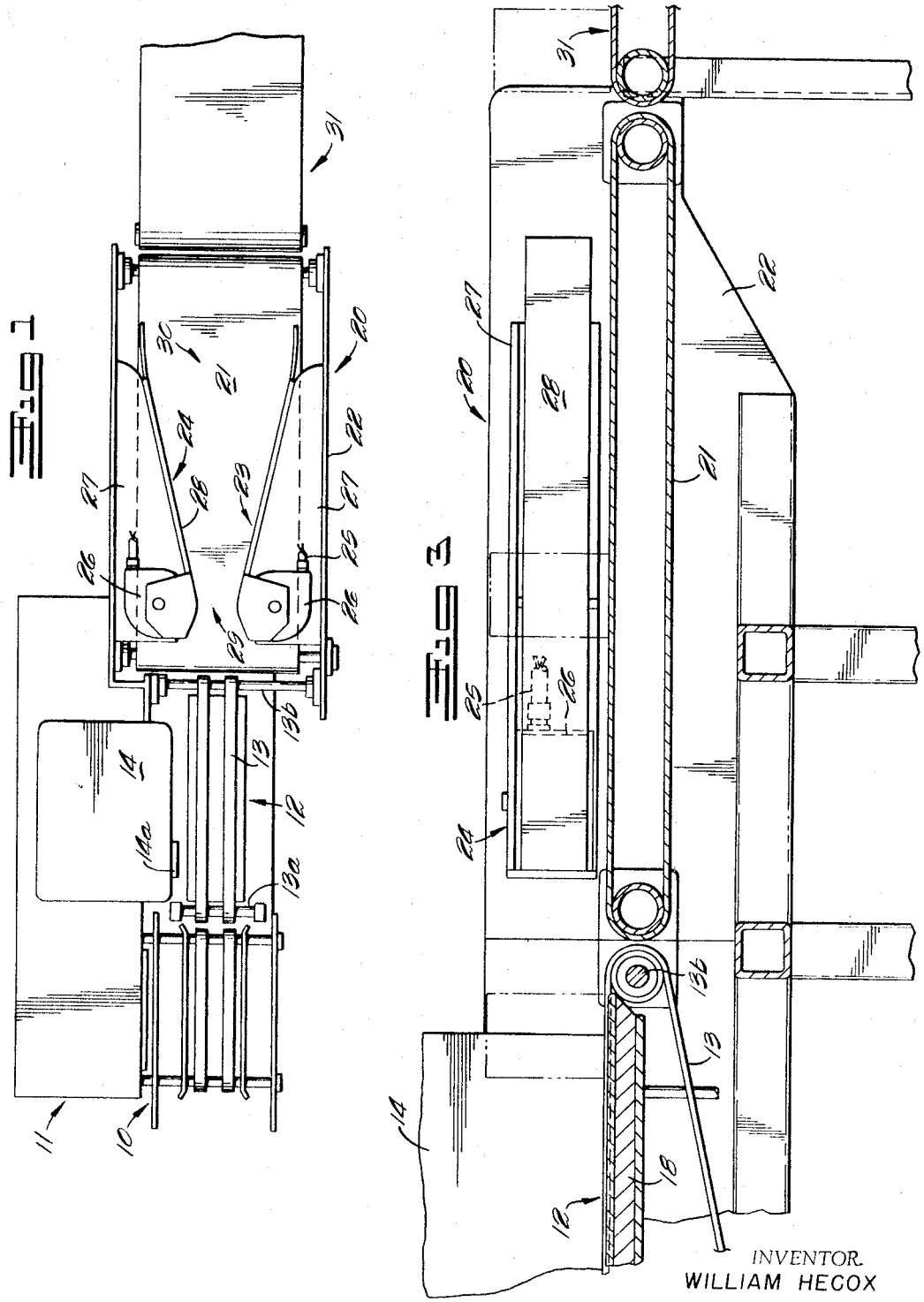

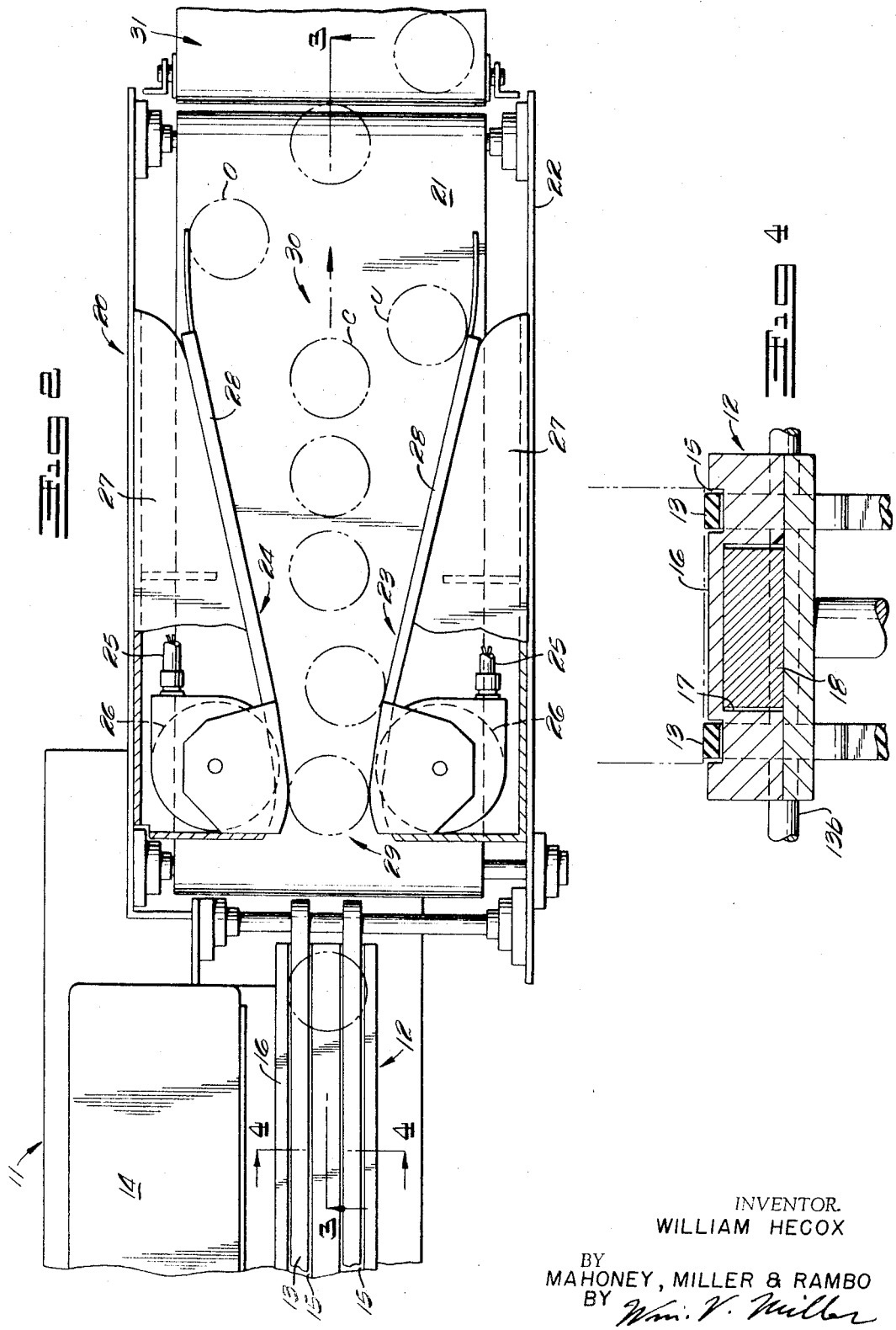

3,308,924
ARTICLE CHECK-WEIGHING AND SEGREGATING APPARATUS
William Hecox, Canal Winchester, Ohio, assignor, by mesne assignments, to Exact Weight Scale Corporation, Columbus, Ohio, a corporation of Ohio
Filed Mar. 29, 1965, Ser. No. 443,226
2 Claims. (Cl. 198—39)

This invention relates to an article check-weighing and segregating apparatus. It has to do, more particularly, with apparatus for classifying or segregating articles according to their weight as the articles are advanced continuously at a high speed in a stream and without interruption in their sustained movement. The present apparatus is adapted to be used with articles which are inherently magnetic or articles or commodities which are enclosed in packages or containers of magnetic material.

The design of check-weighing and segregating apparatus in the last few years has concentrated on apparatus in which the speed of movement of the articles or commodities is greatly increased so as to greatly increase the capacity of the apparatus. The segregation of the articles or commodities is based on weight and usually the articles are separated into correct weight, overweight and underweight groups. In the check-weighing operation, the articles move across a weighing platform usually in the form of a conveyor traveling at very high speed. This speed is so high that the articles do not settle down on the weighing platform during their high-speed passage over it with the result that other forces, in addition to weight, are registered by the scale as the articles pass over the platform.

According to this invention, the apparatus is such that as the articles pass over the weighing platform, if they are not of the exact or correct weight desired, a signal is produced which actuates a segregating means beyond the scale platform. Therefore, it is very important that the signal-producing means actuated by the weighing scale accurately reflects the weight of the successive articles as they move over the platform. Consequently, this invention provides magnetic means which is associated with the weighing platform and which will cause the articles to settle onto the platform during the check-weighing instant to give a weight indication without being affected by the other forces which would otherwise result from the extremely high speed movement of the articles across the platform. In fact, the magnetic means of this invention draws the articles down onto the platform so that they actually become a part of the platform during the check-weighing operation. The result is that in the check-weighing operation all forces except weight are eliminated. Consequently, if a signal is given off during the check-weighing operation, it reflects weight only and no other forces and can be used properly in actuating the segregating means. According to this invention, this segregating means is also magnetic means which serves to separate the previously check-weighed articles into various groups.

In the accompanying drawings, one embodiment of this invention is illustrated but it is to be understood that many variations may be made without departing from basic principles of this invention.

In the drawings:

FIGURE 1 is a schematic plan view of apparatus embodying this invention.

FIGURE 2 is an enlarged plan view of part of the apparatus of FIGURE 1.

FIGURE 3 is a vertical longitudinal sectional view taken along line 3—3 of FIGURE 2.

FIGURE 4 is an enlarged transverse sectional view taken along line 4—4 of FIGURE 2.

With reference to the drawings, there is shown an example of check-weighing and article-segregating apparatus embodying this invention and which is specifically adapted to the check-weighing and segregation of articles of a magnetic nature according to a predetermined weight classification.

This apparatus comprises check-weighing and classifying means generally like that illustrated in the patent to Schieser No. 2,568,255, granted Sept. 18, 1951. The check-weighing mechanism 10 comprises, in general, a scale mounted on a frame structure 11. The weighing mechanism 10 includes a weighing platform 12 of the type having endless, continuously moving conveyor belts 13 with means for driving the belts continuously to quickly move successive articles in a stream across the check-weighing platform during which they are subjected to the check-weighing operation. The belts are shown as flexible non-magnetic strands or ribbons which are carried by the supporting shafts and pulleys 13a and 13b, one of the shafts being driven continuously by suitable means (not shown). The shafts 13a and 13b are supported independently of the platform 12 transversely of and at the respective ends thereof and in a fixed vertical position. The frame structure may also support a housing 14 which may enclose weight-indicating mechanism visible through a window at 14a. This housing may also enclose electronic equipment for analyzing and utilizing an electrical signal when supplied by the weighing mechanism. This signal may be supplied by electronic means of the type disclosed in said patent. The articles are check-weighed and classified as they are moved by the belts 13 across the weighing platter 12 as to one of two or more specific weight classifications. That is, the apparatus would be set to provide a zero signal or no signal should the article passing across the weighing platform be within the desired weight range and to provide a distinguishable, predetermined signal should the article deviate from the desired weight in that either an overweight or an underweight condition is detected. In the example illustrated, the check-weighing mechanism will be set to give no signal if the article is correct weight and to give a different and distinguishable signal if it is either overweight or underweight relative to the predetermined correct weight.

The belts 13 are driven at very high speed so that the successive articles will be carried across the platform 12 at high speed and the check-weighing of each successive article will be accomplished in an instant. However, according to this invention, to obtain a true weight indication magnetic means is provided for drawing the articles down onto the belts 13 and the platform 12 so that only weight forces are registered in the check-weighing operation as the article being weighed actually becomes a part of the platform.

A suitable construction of the platform 12 for this purpose is indicated in the drawings. The platform 12 is made of magnetic material and the belts 13 are preferably non-magnetic. The belts have their upper runs passing through parallel longitudinally extending grooves 15 formed in the upper surface of the platform. Ordinarily the upper surfaces of these belts are above the associated flat surface 16 of the platform but these belts are sufficiently flexible that they can yield downwardly into the grooves with their upper surfaces substantially flush with the surface 16, the grooves being of sufficient depth to permit this. The platform 12 is provided with a chamber 17 extending the full length thereof below the surface 16 and between the belts 13. This chamber receives a relatively strong permanent magnet 18. The magnet is of sufficient strength that it will not interrupt movement of the articles over the surface 16 by the supporting belts 13 but will draw the articles down into contact with that surface as they are moved along by the belts. Thus, the articles will become a part of the platform but will be slid along the surface 16 thereof during the check-weighing operation. This will give a true weight indication of the article during the check-weighing operation.

Supported at one end of the check-weighing mechanism 10 is the article-segregating or classifying apparatus of this invention which is indicated generally at 20. This apparatus comprises an endless belt conveyor 21 which is horizontally supported by a suitable framework 22. The belt conveyor 21 is preferably in the form of a web having upper and lower runs, the upper run being at substantially the same level as the upper runs of the belts 13 of the check-weighing mechanism 10. The belt 21 is driven by any suitable arrangement continuously at a high rate of speed and is adapted to receive the check-weighed articles successively from the check-weighing mechanism 10.

The magnetic segregating or classifying means of this invention is shown as comprising a pair of magnet units 23 and 24 which are selectively energized in accordance with signals which may be given off during the check-weighing operation. In the example shown, these units will separate or classify the check-weighed articles in accordance with their classification as to correct weight, overweight or underweight. The units 23 and 24 are identical. As previously indicated, the signals are in the form of electrical voltages developed by electronic equipment of the type disclosed in said patent during the check-weighing operation. These signals are supplied to the respective magnet units 23 and 24 through the cables 25 connected thereto.

Each magnet unit comprises the magnet itself which is in the form of a magnetic coil 26. This coil is carried by a bracket 27 of magnetic material which is attached to the side of the frame 22 so that it extends over and along the adjacent edge of the upper run of the belt 21 and in spaced relationship thereto. At its inner edge, the bracket 27 carries an upstanding guide plate or flange 28 which is of magnetic material and will be magnetically energized each time the associated magnetic coil 26 is energized and which is properly connected thereto. The two guide plates 28 are so carried by the brackets 27 that they form a guide or classifying channel over the upper run of the belt 21 which has a narrow inlet mouth end 29 and a wide outlet or discharge end 30. The guides 28 converge at the inlet 29 (FIGURE 2) which is at the center line of the conveyor and the inlet is of a width just slightly greater than the diameter or width of the articles supplied from the check-weighing mechanism 10 at the center line thereof. The guides 28 diverge towards the side edges of the conveyor belt 21 and, as indicated above, one of these will be energized to direct overweight articles O to one side of the conveyor belt 21 and the other to direct underweight articles U to the other side of the conveyor belt 21. Correct weight articles C will travel onto the conveyor belt 21 in a straight line since they will not be diverted by energization of either magnet. Thus, the articles will be classified in accordance with signals developed during the check-weighing operation and these signals will reflect weight forces only, since the magnet 18 on the weighing platform 12 causes the articles to be drawn down onto the platform during their passage over it. The classification is accomplished by the magnetic segregating means 20 which receives the correct signals from the check-weighing means 10.

The classified articles may be removed from the conveyor belt 21 by any suitable means such as the continuously driven endless belt take-off conveyor 31.

It will be apparent that this invention provides cooperating check-weighing and classifying mechanism having many advantages, many of which have been discussed and others of which will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A check-weighing mechanism comprising a weighing platform, means for moving magnetic articles across the platform at high speed, and magnetic means carried by the platform for drawing the articles down against the platform as they are moved across the platform but having insufficient force to interrupt said movement across the platform, said means for moving the articles across the platform comprising downwardly yieldable belts associated with a flat surface of the platform, said magnetic means carried by the platform comprising a permanent magnet for exerting a downward pull on the belt-supported articles so that they will move into contact with said flat surface.

2. The combination of claim 1 in which said platform has grooves in its surface for receiving the belts, said belts being supported at a fixed level independent of the platform, said belts being endless belts of non-magnetic material with the upper run associated with said grooves and sufficiently flexible to move from a normal level out of said grooves to a depressed level in said grooves.

References Cited by the Examiner

UNITED STATES PATENTS

| | | | |
|---|---|---|---|
| 1,923,009 | 8/1933 | Miller | 209—121 |
| 2,176,784 | 10/1939 | Bowden | 209—121 X |
| 2,712,408 | 7/1955 | Weber | 209—121 X |
| 2,881,901 | 4/1959 | Zimmer | 198—41 |
| 3,167,171 | 1/1965 | Harmon | 198—41 |

M. HENSON WOOD, JR., *Primary Examiner.*

R. A. SCHACHER, *Assistant Examiner.*